US00RE35740E

United States Patent [19]

Piasecki et al.

[11] E Patent Number: Re. 35,740

[45] Reissued Date of Patent: Mar. 3, 1998

[54] TELECOMMUNICATION SYSTEM

[75] Inventors: Joshua Piasecki, Ramat Gan; Sason Sourani, Hod Hasharon, both of Israel

[73] Assignee: ECI Telecom Ltd., Petach Tikva, Israel

[21] Appl. No.: 245,606

[22] Filed: May 19, 1994

Related U.S. Patent Documents

Reissue of:

[64] Patent No.: 5,117,453
Issued: May 26, 1992
Appl. No.: 451,748
Filed: Dec. 18, 1989

[30] Foreign Application Priority Data

Mar. 2, 1989 [IL] Israel ..... 89461

[51] Int. Cl.[6] ..... H04M 11/00

[52] U.S. Cl. ..... 379/100; 379/93

[58] Field of Search ..... 379/100, 98, 97, 379/93; 358/425; 370/110.1, 81

[56] References Cited

U.S. PATENT DOCUMENTS

| | | |
|---|---|---|
| 4,691,347 | 9/1987 | Stanley et al. . |
| 4,703,477 | 10/1987 | Adelmann et al. . |
| 4,704,716 | 11/1987 | Bowers et al. . |
| 4,726,019 | 2/1988 | Adelmann et al. . |
| 4,726,043 | 2/1988 | Levesque . |
| 4,730,345 | 3/1988 | Reeve, III . |

(List continued on next page.)

FOREIGN PATENT DOCUMENTS

| | | |
|---|---|---|
| 61-121634 | 6/1986 | Japan . |
| 61-198941 | 9/1986 | Japan . |
| 62-230130 | 10/1987 | Japan . |
| 63-26044 | 2/1988 | Japan . |
| 63-93238 | 4/1988 | Japan . |
| 64-81442 | 3/1989 | Japan . |

OTHER PUBLICATIONS

Fascicle VIII.1—Rec. V. 29, 9600 Bits Per Second Modem Standardized for Use on Point-to-Point 4-Wire Leased Telephone-Type Circuits, (Geneva 1976; amended at Geneva, 1980 . . . Melbourne, 1988).

Facicle VII.3—Rec. T.4, Standardization of Group 3 Facsimile Apparatus for Document Transmission. (Geneva 1980, amended at Malaga-Torremolinos, 1984 and Melbourne, 1988).

(List continued on next page.)

*Primary Examiner*—Curtis Kuntz
*Assistant Examiner*—Stella L. Woo
*Attorney, Agent, or Firm*—Cushman, Darby & Cushman

[57] ABSTRACT

A telecommunication system for interconnecting a plurality of telephone communication trunks to a transmission network, the system including transmission apparatus at a first end of the transmission network including apparatus for detecting facsimile signals on the plurality of telephone communication trunks, apparatus for demodulating the facsimile signals, apparatus for transmitting along the transmission network, in demodulated form, the facsimile signal output from the apparatus for demodulating, and receiving apparatus at a second end of the transmission network including apparatus for modulating the facsimile signals received along the transmission network.

61 Claims, 7 Drawing Sheets

U.S. PATENT DOCUMENTS

| | | |
|---|---|---|
| 4,736,389 | 4/1988 | Debus, Jr. et al. . |
| 4,748,620 | 5/1988 | Adelmann et al. . |
| 4,754,386 | 6/1988 | De Weerd . |
| 4,759,037 | 7/1988 | Debus, Jr. et al. . |
| 4,759,039 | 7/1988 | Debus, Jr. et al. . |
| 4,763,019 | 8/1988 | Duguay et al. . |
| 4,763,317 | 8/1988 | Lehman et al. . |
| 4,769,833 | 9/1988 | Farleigh et al. . |
| 4,774,496 | 9/1988 | Tomasevich . |
| 4,780,884 | 10/1988 | Karabinis . |
| 4,790,003 | 12/1988 | Kepley et al. . |
| 4,837,798 | 6/1989 | Cohen et al. . |
| 4,864,612 | 9/1989 | Mahajan . |
| 4,870,497 | 9/1989 | Chamzas et al. . |
| 4,894,633 | 1/1990 | Holtfreter . |
| 4,894,823 | 1/1990 | Adelmann et al. . |
| 4,916,691 | 4/1990 | Goodman . |
| 4,922,348 | 5/1990 | Gillon et al. . |

OTHER PUBLICATIONS

Study Group XVIII—Report R 26(A), International Telegraph and Telephone Consulatative Committee, 1985–1988, Aug. 1986, "Report of the Geneva Meeting (8–15 Jul. 1986) . . . Part A".

Integral Modems, Rockwell, R96DP 9600 BPS Data Pump Modem, Data Sheet Order No. MD07, Mar., 1984 Document No. 29200N07.

"An Unbeatable Combination of Speed, Size, Versatiltiy and Price", Master Systems Brochure for the MS9600S, V29 9600 bps Modem.

Master Systems Brochure, MS9600S, V29 9600 bps Modem.

Craycom Brochure, MS 9600S, V29 9600bps Modem, Craycom Networking by Design.

Thorn EMI Datatech Brochure, 9648FT Modem, Thorn EMI Datacomms—Placing the World at Your Fingertips.

Musgrave, "Going for Speed", Datamation, Feb. 1987.

"Breaking The Throughput Barrier: Which High-Speed Modems Test Best", Data Communications, May 1988, Special Report.

Dimolitsas et al., "Evaluation of ADPCM Coders for Digital Circuit Multiplication Equipment", Comsat Technical Review, vol. 17, No. 2, Fall 1987.

Takebayashi et al., "A 32kbps ADPCM With Improvement in Coding Characteristics for 9600bps Modem Signal", IEEE, 1986.

Benvenuto et al., "Waveform Coding of 9.6 kb/s Voiceband Data Signals at 32 kb/s", IEEE 1987.

Artzt, "Duplex Transmission of Frequency-Modulated Sound and Facsimile", RCA Review, vol. V1, No. 1, Jul. 1941.

Kamae et al., "Experiments on Facsimile Intelligent Communication System FICS-0", Review of the Electrical Communication Laboratories, Nippon Telegraph and Telephone Public Corp., vol. 28, Nos. 9–10, Sep./Oct./1980.

Black, "PLC-1:A TASI System for Small Trunk Groups", IEEE Transactions on Communications, vol. Com-30, No. 4, Apr., 1982.

Agrawal et al., "The Design of an ADPCM/TASI Sysem for PCM Speech Compression", IEEE Transactions on Communications, vol. Com-29, No. 9, Sep., 1981.

Chamzas et al., "Progressive Encoding of Facsimile Images Using Edge Decomposition (PED)", GLOBECOM '88: IEEE Global Telecommunications Conference . . . Information Age, Hollywood, FL, Conference Record Nov./Dec./1988.

Chamzas et al., "Encoding Facsimile Images for Packet-Switched Networks", IEEE Journal of Selected Areas in Communications, vol. 7, No. 5, Jun. 1989, pp. 857–864.

Johnsen et al., "Coding of Two-Level Pictures by Pattern Matching and Substitution", The Bell System Technical Journal, vol. 62, No. 8, Oct. 1984, pp. 2513–2545.

Mounts et al., "Some Extensions of the Ordering Techniques for Compression of Two-Level Facsimile Pictures", The Bell System Technical Journal, vol. 57, No. 8, Oct. 1978, pp. 3057–3067.

Segen et al., "Facsimile Compression by Pattern Matching", Proceedings—1982, IEEE Computer Society Conference on Pattern Recognition and Image Processing, Las Vegas, NV, Jun. 1982, Conference Record, pp. 191–196.

Johnsen et al., "A Pattern Matching Technique for Facsimile Coding", IEEE International Conference on Communications: ICC '82, The Digital Revolution, Philadelphia, PA, Jun. 1982, Conference Record, pp. 2G.2.1–2G.2.7.

TELECOMMUNICATION SYSTEM

Matter enclosed in heavy brackets [ ] appears in the original patent but forms no part of this reissue specification; matter printed in italics indicates the additions made by reissue.

FIELD OF THE INVENTION

The present invention relates to communications apparatus generally and more particularly to telecommunication systems with facsimile demodulation and modulation capabilities.

BACKGROUND OF THE INVENTION

Various types of telecommunication systems for interconnecting telephone communication trunks to a transmission network are known in the patent literature and in the marketplace. One type of such apparatus is known as Digital Circuit Multiplication Equipment systems which typically include Time Assignment Speech Interpolation (TASI) Apparatus. There is described in applicant's European Patent and in applicant's U.S. Pat. No. 4,523,309, TASI apparatus which has gained widespread market acceptance.

A particular feature of the abovementioned U.S. Pat. No. 4,523,309 is that control information such as the assignment, synchronization and identification information is transmitted along the communication channels instead of on separate signaling channels as in the prior art. In addition, the signaling communication channel assignment information is also supplied via the voice channels rather than via the signaling channels.

Another type of telecommunication system for interconnecting telephone communication trunks to a transmission network is described in a paper by R. W. Muise et al entitled "Experiments in Wideband Packet Technology," given at the International Zurich Seminar on Digital Communication, April, 1986. The paper discloses a system which comprises an access interface and a wideband packet switch for sending packets of speech and data across a transmission network.

There are known Digital Circuit Multiplication Equipment (DCME) systems in which the advantages of Digital Speech Interpolation (DSI) and adaptive pulse code modulation (ADPCM) compression techniques have been incorporated, as demonstrated in applicant's U.S. Pat. No. 4,747,096 which also uses voice channels for the transmission of control information. In addition, the system detects voiceband data transmission and compresses it according to an optimal ADPCM adapted for voiceband data.

However, the optimal ADPCM adapted for voiceband data compresses the voiceband data at a 2:1 rate whereas the compression rate of the DSI and the ADPCM for speech is 6:1. Thus, with the current proliferation of personal facsimile machines whose signals when transmitted via a DCME are compressed as voiceband data, the overall compression rate of a DCME is approaching 3:1.

In a Delayed Contribution D.788/XVIII presented at the CCITT Working Party XVIII/8 in Geneva Switzerland on Jul. 8–15, 1986 by EUTELSAT entitled "EUTELSAT Considerations on LRE-DSI characteristics for Digital Circuit Multiplication", there appears a proposal to demodulate V.29 voice band data signals in order to enable such signals to be transmitted via a compression system which employs ADPCM encoding for signal compression. This reference only proposes V 29 modem demodulation in DCME but does not explain how to do it. Importantly, it does not teach how to detect facsimile signals for subsequent demodulation thereof.

In a Final Report submitted to the International Maritime Satellite Organization (INMARSAT) entitled "Study of Facsimile Interface Units for Future Inmarsat Digital Communications System" dated Jul. 28, 1988 there is proposed a concept for demodulation of an all-facsimile channel. No consideration is given to detection of facsimile signals on a "mixed" channel which carries both speech and facsimile signals, and switching between different processing routes for facsimile and speech in response to such detection. Furthermore, this reference does not deal with many facsimile protocols which are in common use in such "mixed" channels.

SUMMARY OF THE INVENTION

The present invention seeks to provide a telecommunication system with improved facsimile signal compression capabilities.

There is thus provided in accordance with a preferred embodiment of the invention a telecommunication system for interconnecting a plurality of telephone communication trunks to a transmission network, the system comprising transmission apparatus at at least a first end of the transmission network and receiving apparatus at at least a second end of the transmission network. The transmission apparatus includes apparatus for detecting signals on the plurality of telephone communication trunks and classifying the signals at least as selected facsimile signals and other signals, first apparatus for demodulating the selected facsimile signals, second apparatus for compressing the other signals, and apparatus for communicating the nature of signals transmitted along the transmission network. The receiving apparatus includes apparatus for receiving communications from the apparatus for communicating for determining the nature of signals received along the transmission network, third means for modulating the selected facsimile signals received along the transmission network, and fourth means for decompressing the other signals received along the transmission network.

It is understood that the demodulation and modulation may be complete including, for example, descrambling and scrambling, or incomplete not including scrambling and descrambling.

Additionally, in accordance with a preferred embodiment of the invention the other signals comprise voice signals and voiceband data signals. The second apparatus comprises both apparatus for compressing the voice signals and apparatus for compressing the voiceband data signals. The fourth apparatus comprises both apparatus for decompressing the voice signals and apparatus for decompressing the voiceband data signals.

Further, in accordance with a preferred embodiment of the invention the selected facsimile signals are Group 3 facsimile signals.

Still further, in accordance with a preferred embodiment of the invention the apparatus for detecting and classifying includes apparatus for detecting signal activity, apparatus for detecting the presence of voiceband data signals and apparatus for detecting the presence of group facsimile signals, comprising apparatus for detecting a sequence of flag characters.

In accordance with a preferred embodiment of the invention the demodulating apparatus comprises a plurality of facsimile demodulators, each having a different mode of operation corresponding to a group 3 facsimile signal, apparatus for initially supplying incoming selected facsimile signals simultaneously to the plurality of facsimile demodulators, apparatus for determining which of the plurality of facsimile demodulators initially successfully demodulates an incoming selected facsimile signal, and apparatus for utilizing the facsimile demodulator which initially successfully demodulates an incoming selected facsimile signal for continuing demodulation of the incoming selected facsimile signal. Since there are many facsimile transmissions which do not adhere to the standard protocol definitions as defined in CCITT Red Book Rec. T.50, the data rate and mode of operation of the incoming facsimile signal cannot be derived from a protocol analysis. It is an object of the present invention to provide facsimile signal classification by waveform analysis, rather than protocol analysis. Thus, at the beginning of each facsimile signal burst, a plurality of facsimile demodulators are needed to simultaneously demodulate the incoming facsimile signals.

Additionally, in accordance with a preferred embodiment of the invention the demodulating apparatus comprises facsimile signal demodulator and forward error correction apparatus wherein the forward error correction apparatus is operative to protect the output of the facsimile demodulator.

An object of the present invention is to provide a facsimile signal compression ratio between 4:1 and 6:1, a ratio much higher than that achievable by treating facsimile transmissions a voiceband data signals. The present invention achieves the desired compression ratio by demodulating facsimile modem signals and transmitting that information in binary data form to the far end terminal where the original facsimile mode signal is reproduced.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 6:
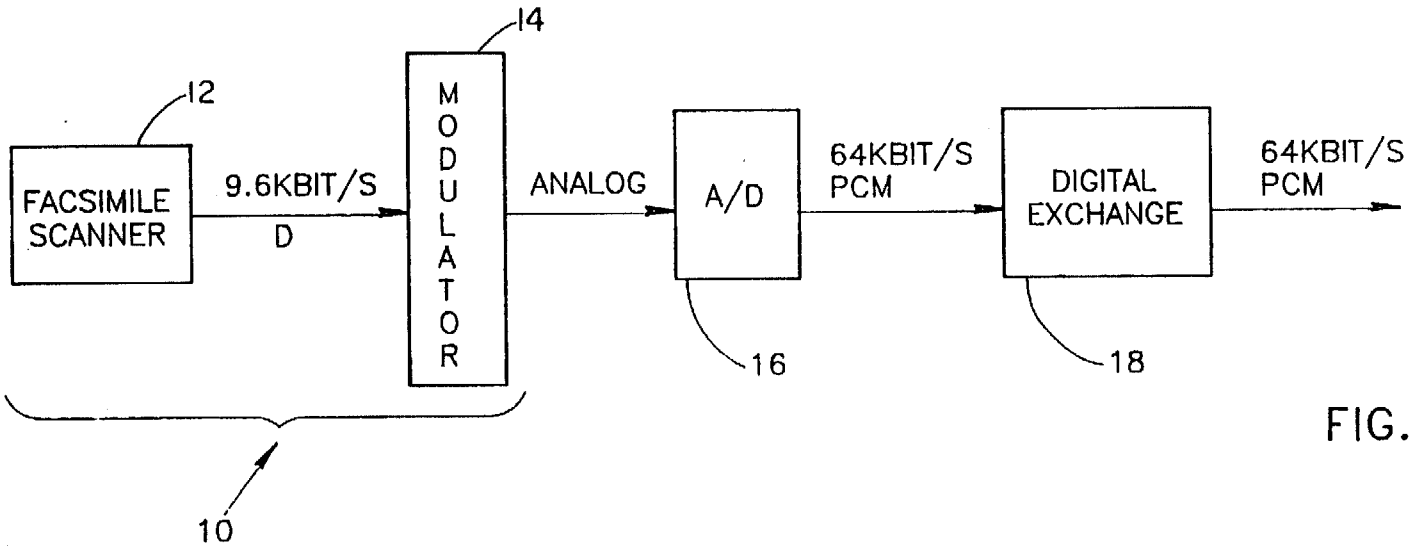
FIG. 6 is a block diagram illustration of the signal flow from a facsimile machine, through local telephone lines, to a switching center useful in understanding the system of FIG. 1.

Reference is now made to FIG. 6 which illustrates the data flow from a facsimile machine through a local telephone system to a transmission network. A facsimile machine 10, according to CCITT Red Book, Malaga-Torremolinos 1984, Recommendations T.4 and T.30, comprises a facsimile scanner and encoder 12, according to CCITT Red Book Recommendation T.4, which produces a binary bit stream, at rates up to 9.6 kbit/s, representing a compressed version of the scanned page, and a modulator 14, such as the R96MFX Monofax by Rockwell International, which modulates the binary bit stream onto an analog waveform for transmission through local analog telephone systems.

The Group 3 facsimile call procedure is defined in detail in CCITT Red Book Rec. T.30. Typically, the facsimile call begins with a 2100 Hz. tone from the called terminal, followed by a coordination dialog between the two facsimile machines at a rate of 300 bit/s, modulated according to CCITT Red Book Rec. V.21, channel 2. The facsimile messages are transmitted, page by page, at data rates of 2400, 4800, 7200, and 9600 bit/s, modulated according to CCITT Red Book Rec. V.27 ter for the two lower rates and according to CCITT Red Book Rec. V.29 for the two upper rates. It should be noted that CCITT Red Book Rec. T.30 also allows for non-standard 300 bit/s protocols.

An analog to digital (A/D) converter 16 receives the analog waveform and samples the signal in order to transform it to a standard 64 kbit/s pulse code modulated (PCM) digital signal. The digital PCM signal is then transmitted, as one time slot or a 2.048 or a 1.544 Mbit/s signal, via a digital exchange 18, such as the 4ESS from AT&T, which may subsequently transmit it to a transmission system, such as is described hereinbelow. It should be noted that the digital signal produced by the facsimile scanner 12 is a binary data signal and the digital signal produced by the A/D converter 16 is in the form of digital samples of an analog waveform. The two rates are significantly different (up to 9.6 kbit/s vs. 64 kbit/s) and thus, the transmission of the binary data via current methods of telephony is wasteful.

According to the teachings of the present invention, the transmission efficiency of digital links is increased by reproducing the originally scanned and encoded binary data from the PCM signal of the modulated analog waveform and then transmitting it along a transmission network as a 9.6 kbit/s signal. According to an alternative embodiment of the invention the binary data is transmitted as a 16 kbit/s signal which comprises the 9.6 kbit/s signal and additional error correction code, thus significantly increasing the robustness of the transmission in presence of line errors. Without error correction, the system of the present invention achieves a 6:1 compression ratio for facsimile transmissions and with error correction it achieves a 4:1 compression ratio.

Figure 1:
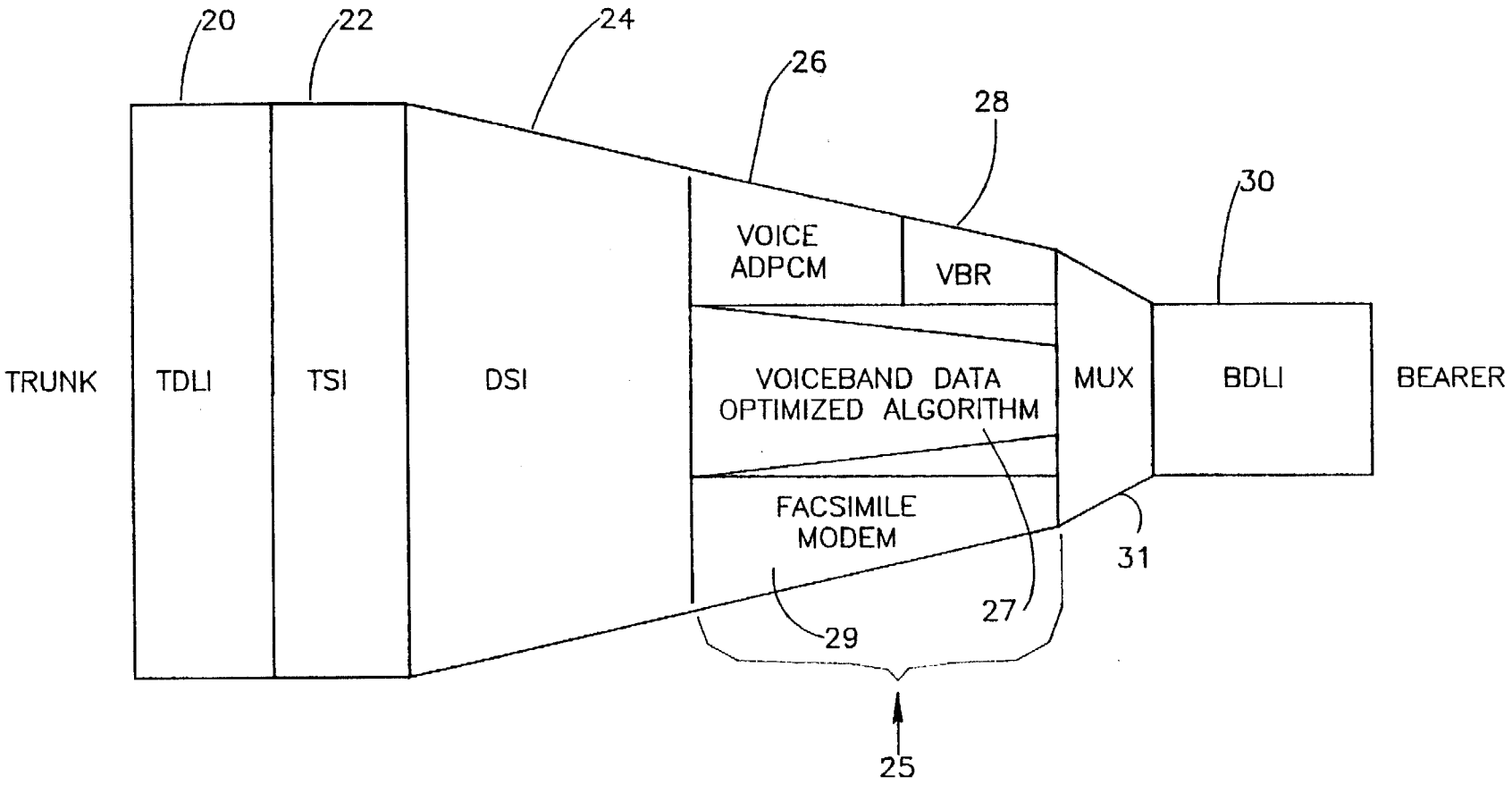
FIG. 1 is a functional block diagram illustration of the transmit side and the receive side of the system showing graphically functions of the international telephone multiplication system, including the facsimile signal compression functions, constructed and operative in accordance with a preferred embodiment of the present invention.

Reference is now made to FIG. 1, which is an overall functional system block diagram of the transmission and reception end of a telecommunication system, indicating three methods of signal compression as well as the trunk expanding functions of the various elements of the telecommunication system. The transmit side is described with respect to FIG. 1. The receive side is mirror symmetric and will not be described with respect to FIG. 1. Many of the components of the telecommunication system are substantially similar to those described and claimed in the aforesaid U.S. Pat. No. 4,717,096, which is incorporated herein by reference, and therefore, will not be described in detail. It will be appreciated that the telecommunication system described in FIG. 1 can be implemented in a point to point configuration, in a multiclique configuration, and in a multidestination configuration, as defined in CCITT Blue Book Rec. G.763. Additionally, it can be implemented as an access terminal for traffic compression into a packet switching network.

The transmission apparatus includes a trunk PCM interface (TDLI) 20 which is operative to provide interfacing between 1.544 Mbit/s or 2.048 Mbit/s PCM signals and the internal 2.048 Mbit/s (NRZ) signals employed in the telecommunication system. It is operative to provide synchronization plesiochronous buffering and optional format conversion.

Downstream of TDLI 20 there is provided a time slot interchange (TSI) 22 which provides time slot mapping. It enables up to ten 24-channel bit streams to be regrouped into eight 30/32 channel bit streams.

Digital speech interpolation circuitry (DSI) 24 provides voice compression by means of the time assignment speech interpolation (TASI) of U.S. Pat. No. 4,523,309 and is operative to compress up to 240 trunks generally into 62 bearer channels. Additionally, DSI 24 provides detection circuitry for classifying incoming signals as selected facsimile signals, such as Group 3 facsimile signals, and as other signals where other signals typically include speech, tone and non-facsimile voiceband data. This enables the transmission apparatus to separately compress facsimile signals and to apply the conventional compression techniques for speech and non-facsimile voiceband data signals.

Further compression is provide by a signal compression circuit 25 typically comprised of Adaptive Differential Pulse Code Modulation (ADPCM) circuitry 26 and Variable Bit Rate (VBR) circuitry 28, voiceband data optimized algorithm circuitry 27 and facsimile modem 29.

ADPCM circuitry 26 employs an ADPCM algorithm, in accordance with the Red Book CCITT G.721 recommendation for compressing speech. VBR circuitry 28 is typically provided in conjunction with ADPCM 26 and is operative to effectively create additional bearer channels (in excess of 62) to overcome periods of traffic overload, as described in aforesaid U.S. Pat. No. 4,747,096. The ADPCM 26 and the VBR 28, in conjunction with the DSI 24, provide a compression ratio of typically 6:1 for speech signals. It will be appreciated that circuitry employing other speech compression techniques, such as 16 kbit/s speech coding, can replace the ADPCM 26 circuitry.

Voiceband data is routed through voiceband data optimized algorithm 27 which employs ADPCM codecs specifically optimized for reliable transmission of voiceband data, as described in aforesaid U.S. Pat. No. 4,747,096. The voiceband data algorithm is transparent to voiceband data signals and provides a 2:1 compression ratio. It will be appreciated that the voiceband data compression may be implemented using other algorithms, such as that of CCITT Blue Book, Melbourne 1988, Rec. G.723.

In accordance with a preferred embodiment of the present invention, facsimile modem 29 is provided for reproducing a plurality of original facsimile binary data from a plurality of PCM signals, for optionally incorporating error correction information into the plurality of original facsimile binary data and for multiplexing the resultant signals. The optional error correction function is typically provided when the transmission network is of the type where performance is typically degraded.

Multiplexer 31 multiplexes the output of the signal compression stage, comprising ADPCM 26, VBR 28, voiceband data algorithm 27 and facsimile modem 29 into one generally fully populated 2.048 or 1.544 Mbit/s signal. At each sample period, which is typically 125 microseconds, multiplexer 31 produces one bit frame with bits from compressed channels.

An alternative embodiment of the invention comprises a multiplexer 31 which incorporates wideband packet technology, as described in the aforementioned paper by R. W. Muise et al entitled "Experiments in Wideband Packet Technology". In the alternative embodiment, the multiplexer 31 is operative to act as a Packet Assembler (PA) to gather and packetize a sequence of samples of compressed speech, voiceband data or facsimile data and to subsequently transmit the packets to a transmission network.

Interface between the 2.048 Mbit/s output from the multiplexer 31 to the standard 1.544/2.048 Mbit/s standard PCM bearer channels is provided by the Bearer PCM Interface (TDLI) 30, described in aforesaid U.S. Pat. No. 4,747,096.

Figure 2A:
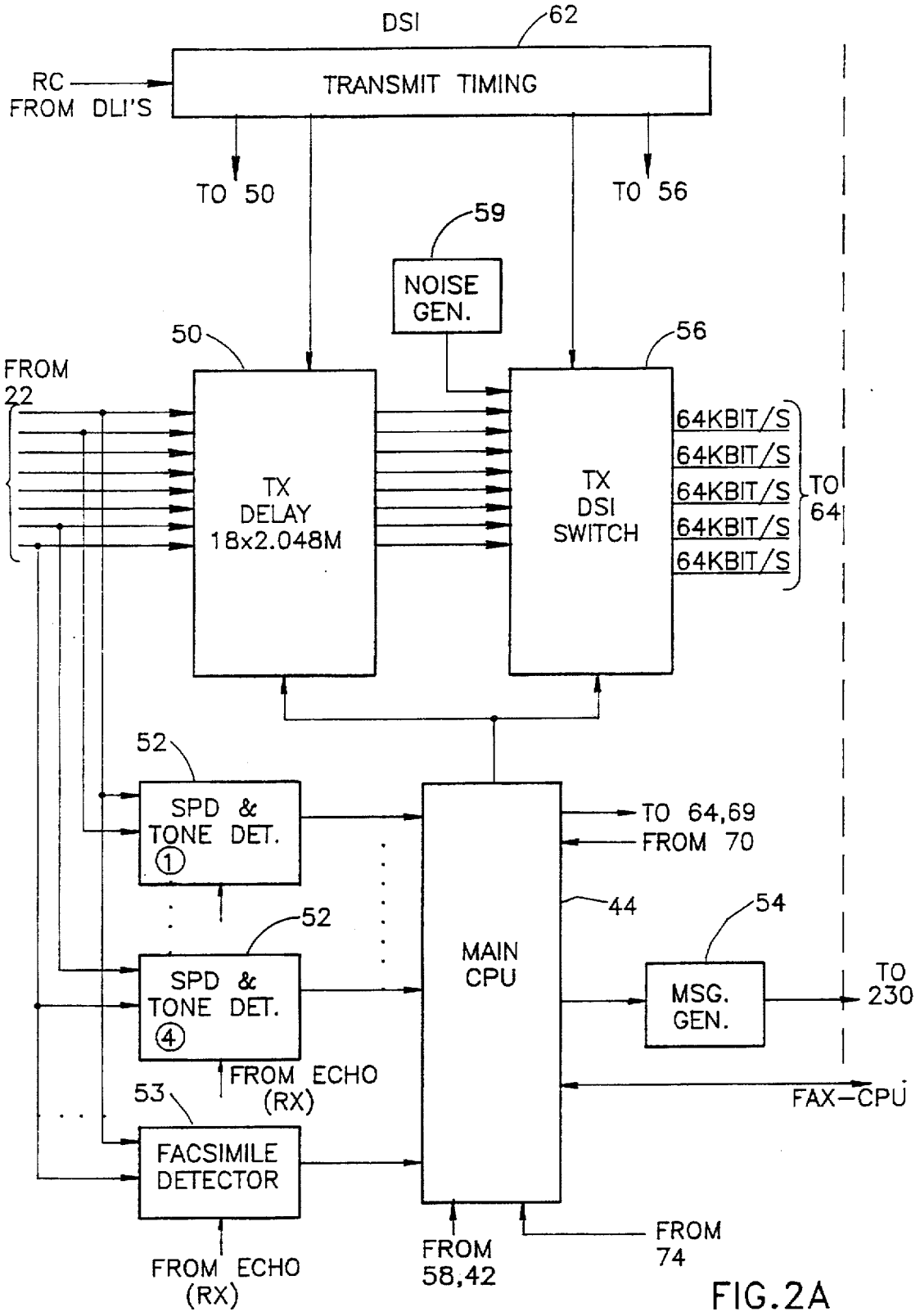
FIGS. 2A and 2B, are block diagram illustrations of elements of the transmit circuitry constructed and operative in accordance with a preferred embodiment of the present invention.
Figure 2B:
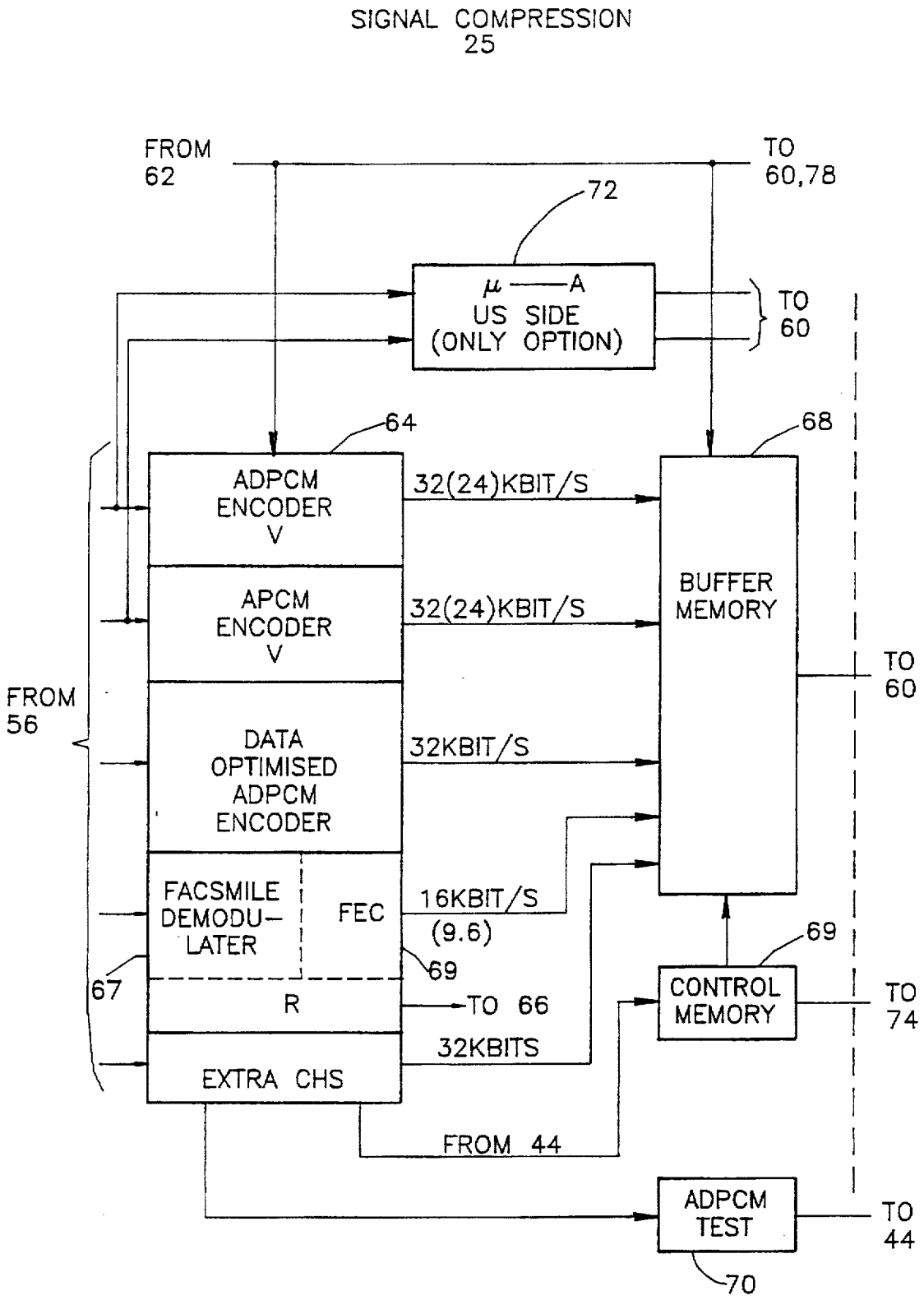

Reference is now made to FIG. 2, which illustrates in block diagram form certain elements of the transmission apparatus of the telecommunication system pertaining to the present invention and corresponding to the functional block diagram of FIG. 1. A complete description of the remaining elements can be found in aforesaid U.S. Pat. No. 4,747,096.

Eight 2.048 Mbit/s bit streams emerging from the TSI 22 are supplied to the DSI circuitry 24 and are directed in parallel to a transmit delay memory 50, to a facsimile detector 53 and to other detectors, such as speech and tone detection circuitry 52.

Speech and tone detection (SPD) circuitry 52 typically comprises four SPD circuits, each of which receives 2×2.048 Mbit/s digital streams from the transmit TSI circuitry 22. The SPD circuitry 52 is operative to examine each time slot for the present of speech energy above an adjustable threshold which is normally set at −32 dBmO.

If speech energy is present, a main CPU 44 is notified of the time slot that has active speech. Additionally, the tone detector portion of the SPD circuitry 52 examines the active speech for the continuous presence of a 2100 Hz tone (CCITT Red Book Rec. G.164 or Rec. V.25 for voiceband data or Rec. T.30 for facsimile data). When the tone is detected, the main CPU 44 is notified.

Facsimile detector 53 additionally receives all eight of the 2.048 Mbit/s bit streams received from TSI 22 and detects the presence of facsimile signals on them. Since Group 3 facsimile systems begin their 300 bit/s transmissions with a preamble, defined in the 1984 CCITT Red Book Recommendation T.30 paragraph 5.3.1 to be a series of flag characters transmitted for one second on a 300 bit/s signal, it will be appreciated that the preamble is unique to facsimile systems and thus, can be utilized for reliable detection of facsimile signals; other data protocols transmit at most one or two flag characters. Thus, facsimile detector 53 detects a facsimile transmission upon identifying at least five consecutive flag characters.

If a facsimile transmission is present, facsimile detector 53 notifies the main CPU 44 of the trunk channel in which it occurs. If the detection occurs for a trunk channel which is not classified as carrying facsimile signals, then the main CPU 44 marks the trunk channel as a facsimile trunk channel. Until marked otherwise, the trunk channel remains as a facsimile trunk channel and any further detections of a facsimile transmission on that trunk channel are ignored.

The main CPU 44, typically based on the Intel 80286 microcomputer, controls the DSI operation as well as other functions of the telecommunication system. Its major task, as part of the transmission apparatus, is to receive activity information about facsimile transmissions and other signals, such as speech, tone and voiceband data, and to assign an available bearer bit portion to the active trunk. In order to do so, it routes the time slots of the eight 2.048 Mbit/s channels, via a transmit Digital Speech Interpolation (DSI) switch 56, to either of the ADPCM 26, the voiceband data algorithm 27 or the facsimile modem 29, depending on the results of the SPD and tone detector 52 and the facsimile detector 53. Main CPU 44 also indicates to a facsimile CPU 80 which is part of the facsimile modem 29 and which is described in more detail hereinbelow, in which time slot it will receive a facsimile transmission and in which bit portion it should transmit the demodulated facsimile transmission. The main CPU 44 additionally detects the completion of a facsimile transmission on a facsimile channel. The software for the main CPU 44 is taken mostly from apparatus of the type described in the aforesaid U.S. Pat. No. 4,747,096.

Following initial detection of a facsimile transmission, the system switches to a facsimile signal path. The switching takes place during the first silent period during facsimile "handshake" following detection. Effecting the switching during the silent period avoids undesirable signal transients.

The transmit DSI switch 56 receives 8×2.048 Mbit/s digital streams from the transmit delay 50 and selects, in response to commands from the main CPU 44, an appropriate time slot. The standard 2.048 Mbit/s bit stream contains 30 speech time slots (TS); however, in accordance with U.S. Pat. No. 4,747,096, when TS 16 is not used for the transmission of signaling information, 31 time slots are available for speech.

Thus, two bit streams of up to 62 time slots during operation at normal speech traffic levels, one bit stream with up to 31 voiceband data signals and one bit stream with up to 31 facsimile signals are provided. Additionally, an additional 20 time slots are provided for use during periods of traffic overload, as a result of VBR operation. The 144 available time slots form an output of five 2.048 Mbit/s digital streams where the fifth 2.048 Mbit/s digital strum comprises the 20 additional time slots. The remaining 11 time slots of the fifth 2.048 Mbit/s digital stream are unused.

The first two and last one of the five 2.048 Mbit/s digital streams are dedicated to trunk channels with speech activity, the third is dedicated to trunks with non-facsimile voiceband data signals, and the fourth is dedicated to trunks with facsimile transmissions.

DSI 24 also comprises a message generator 54 which receives 2 bytes (16 bits) of message information from the main CPU 44. The message information indicates to the receive circuitry the location, on the bearer bit stream, of the assigned bits for each compressed trunk channel and the type of traffic, speech, voiceband data or facsimile data, carried therein.

Signal compression circuitry 25 comprises a signal compression assembly 64 which receives the five 2.048 Mbit/s digital streams from the transmitting DSI switch 56. The signal compression assembly 64 comprises ADPCM encoders and data optimized ADPCM encoders, fully described in aforesaid U.S. Pat. No. 4,747,096, and facsimile demodulators 67 with optional Forward Error Correction elements (FEC) 69, as described hereinbelow.

Each facsimile demodulator 67 demodulates the 64 kbit/s PCM bit stream received from the DSI switch 56, thus reconstructing the original scanned and encoded bit stream produced by the facsimile machine 10. The optional FEC 69 adds error correction information to the signal to increase the rate of the signal from up to 9.6 kbit/s to 16 kbit/s, a rate which is a submultiple of the 64 kbit/s standard rate or the bearer bit stream.

Multiplexer 31 comprises a buffer memory 68 which combines the outputs of the signal compression assembly 64 into one 2.048 Mbit/s bearer signal. According to the traffic on the transmission network, it will assign nibble time slots to compressed speech and voiceband data signals and the appropriately sized time slots to demodulated facsimile signals, as described hereinbelow.

According to an alternative embodiment of the present invention, buffer memory 68 stores the output of the signal compression assembly 64 and generates, typically every packet interval of 16 msec, packets of typically 128 4 bit samples with an additional 40 bits of packet header information. It should be noted that under overload traffic conditions, the number of bits for each sample will be smaller due to the operation of the VBR 28.

Buffer memory 68 releases the packets under control of the main CPU 44 which receives the speech, voiceband data and facsimile signal activity information from SPD and tone detector 52 and facsimile detector 53 every packet interval and assigns bearer bit portions to each active trunk channel.

Figure 3:
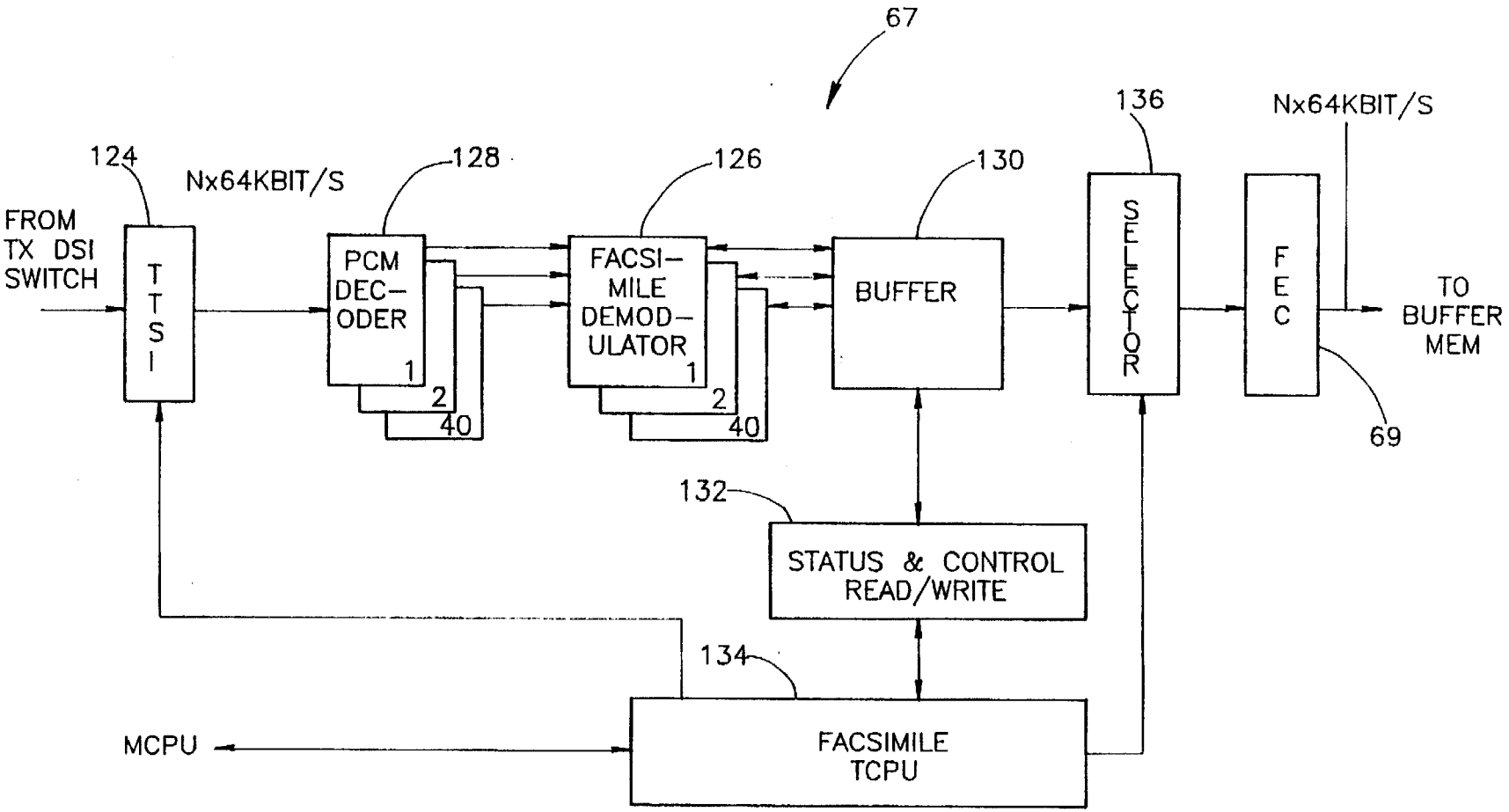
FIG. 3 is a block diagram illustration of the facsimile demodulator useful in the apparatus of FIGS. 2A and 2B.

Reference is now made to FIG. 3 which illustrates the elements of the facsimile demodulator 67 and or the optional FEC 69. According to a preferred embodiment of the invention, facsimile demodulator 67 comprises a plurality of facsimile demodulators 126, such as the R96MFX Monofax from Rockwell International, and a plurality of PCM decoders 128 where each PCM decoder 128 is directly connected to a facsimile demodulator 126. A typical transmission apparatus will comprise 40 facsimile demodulators 126 and 40 PCM decoders 128. It will be appreciated that the 40 facsimile demodulators 126 and 40 PCM decoders 128 are needed in order to decode and demodulate facsimile signals from 31 incoming facsimile trunk channels due to the initial overhead of the five demodulators 126.

At the beginning or each signal burst for a trunk channel marked as carrying a 64 kbit/s facsimile transmission, one incoming time slot is routed to typically five PCM decoders 128 via a facsimile transmit TSI (TTSI) 124, such as the PEB 2040 PCM Switch from Siemens. TTSI 124 typically selects the five PCM decoders 128 based on which five facsimile demodulators 126 are currently available.

According to a preferred embodiment of the invention, each PCM decoder 128 converts the incoming PCM signal to the original analog telephone waveform and sends the resultant signal to its corresponding facsimile demodulator 126. It will be appreciated that the PCM decoders 128 are included in order to utilize inexpensive facsimile demodulators 126, such as the Rockwell R96MFX, specifically designed for facsimile machines.

Each of the five facsimile demodulators 126 is tuned to one of the five standard modes of operation for facsimile data, that is, 2.4 or 4.8 kbit/s modulated according Rec. V.27 ter, 7.2 or 9.6 kbit/s modulated according to Rec. V.29 or 300 bit/s, modulated according to Rec. V.21. Each demodulates the analog telephone waveform it receives from its PCM decoder 128 in an attempt to identify the mode of operation by which the present portion of the facsimile transmission is modulated.

It will be appreciated that it is possible to analyze the facsimile transmission with one facsimile demodulator 126 by utilizing the facsimile demodulator 126 specifically designed for use in facsimile machines 10 to interpret the 300 bit/s protocol between pages which indicate which mode of operation will be used for scanning and encoding the following page. This method has one drawback in that CCITT Red Book Rec. T.30 allows for non-standard protocols between facsimile machines 10.

Thus, a facsimile demodulation system which utilizes one standard facsimile demodulator 126 per facsimile transmission might be unable to interpret the non-standard protocols and thus, be unable to demodulate facsimile transmissions. Therefore, according to a preferred embodiment of the present invention, five facsimile demodulators 126 are utilized to identify the mode of operation of every portion of a facsimile transmission whether it be the 300 bit/s standard or non-standard dialog or the up to 9.6 kbit/s page transmission.

The demodulated data are sent to a buffer 130 and stored there until the demodulator tuned to the correct bit rate and mode of operation is identified. The identification typically takes 0.3 seconds to achieve a positive identification of either a V.29 or V.21 modem by a given demodulator, after which the remaining four demodulators 126 are available and the data they produced in buffer 130 is ignored. Should no positive identification of either the V.29 or V.21 modems is made during the 0.3 second interval and if during this interval an 1800 Hz tone is detected, then the two demodulators which are tuned to the two alternative transmission rates of the V.27 modem continue to operate. Once positive identification is made by either of those two demodulators, the demodulator which did not make a positive identification becomes available and its output in the buffer 130 is ignored.

The identifying demodulator 126 continues demodulating the signal and sending it to the buffer 130 until the signal terminates, typically at the end of the transmission of one page or at the end of a 300 bit/s message transmission.

It is a particular feature of the present invention that notwithstanding the different times needed to detect the various modems and notwithstanding that detection of the V.27 modem requires more than 0.3 seconds, a 0.3 second delay is sufficient to avoid loss of the beginning of the transmitted signal. This is achieved by commencing transmission of the training sequence characteristic of the V.27 modem once identification of the 1800 Hz signal is made but before positive identification of which transmission mode (i.e. 4.8 or 2.4 kbit/s) has been made.

The buffer 130 is operative to receive the data from the facsimile demodulators 126 as 8 bit words and to organize it such that, on average, a 9.6 kbit/s bit stream is sent. If the demodulated information is at a rate less than the maximal 9.6 kbit/s, then the data rate is increased to 9.6 kbit/s by dummy bit insertion.

The buffer 130 achieves the 9.6 kbit/s average bit stream by ensuring that generally 48 bits are sent within milliseconds. The 48 bits are organized such that at every millisecond, either 10 bits or 9 bits are transmitted. Thus, in each millisecond, three channels of facsimile data are multiplexed into 32 bits, transmitted in 8 sampling frames as 4 bit nibbles per frame.

It should be noted that the remaining 2 to 5 bits of the 32 bits in each millisecond, depending on the number of bits sent per each facsimile channel, are dummy bits. This method achieves a 6:1 compression ratio, i.e. transmission of 6 trunks of 64 kbit/s PCM signals via a single 64 kbit/s time slot in the bearer bit stream.

A selector 136 selects, under control of a facsimile transmit CPU (TCPU) 134, the correctly demodulated and multiplexed signals stored in buffer 130 sends them to multiplexer 31 as one partly populated 2.048 Mbit/s digital bit stream.

According to an alternative embodiment of the invention, the signal from the selector 136 is routed through FEC 69 which adds forward error correction to the 9.6 kbit/s signal, typically using the Hamming (15,11) code. Thus, to the 10 or 9 bits, described hereinabove, are added 1 or 2 dummy bits, respectively, where one of the bits serves as a message bit to indicate the number of original bits, to produce 11 bits, another 4 of error correction based on the Hamming (15,11) code, and a final dummy bit to increase the bit count to 16. Thus, two channels of facsimile data are multiplexed into a 32 kbit/s channel, producing a 4:1 compression ratio, i.e. transmission of 4 trunks of 64 kbit/s PCM signals via a single 64 kbit/s time slot in the bearer bit stream.

The operation of the facsimile demodulator 67 is controlled by facsimile CPU 134 which polls the status of the demodulators 126 via a status and control read/write 132, selects five demodulators 126 upon reception of a signal burst, tunes each one to a different standard mode of operation, and indicates to TTSI 124 to switch the current time slot to the five PCM decoders 128. Additionally, it identifies the demodulator 126 which is tuned to the correct mode of operation and indicates to the selector 136 to transmit the data from the identified demodulator 126 to the buffer memory 68, or alternatively, to FEC 69 and from there to buffer memory 68.

The facsimile CPU 134 additionally is connected to the main CPU 44 which indicates to the facsimile CPU 134 which time slots have facsimile data in them, when the facsimile signal burst commences or terminates, and when the facsimile transmission is complete. The completion of a facsimile transmission on a facsimile channel is defined according to the following criteria:

1. A silence period lasting for at least 10 seconds is detected by SPD and tone detector 52 (FIG. 2A); or 2. The five facsimile demodulators 126 attempting to demodulate the facsimile transmission fail to do so within a predetermined length of time, typically 500 ms.

If condition 1 is true, then main CPU 44 causes any following signal bursts on that trunk channel to be switched to an ADPCM encoder for speech. If condition 2 is true, the trunk channel is switched to a data optimized ADPCM encoder.

Figure 4A:
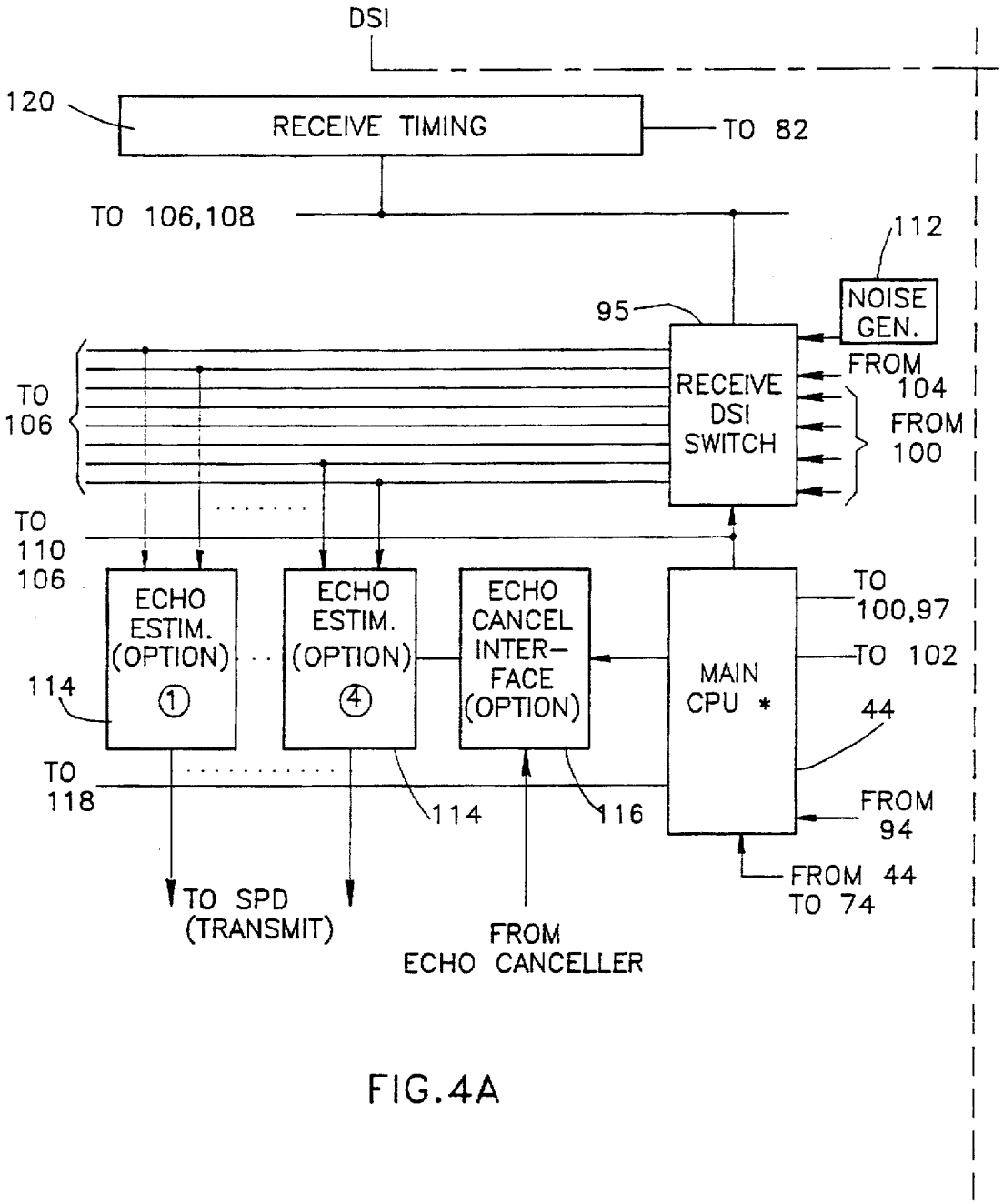
FIGS. 4A and 4B are block diagram illustrations of elements or the receive circuitry constructed and operative in accordance with a preferred embodiment of the present invention.
Figure 4B:
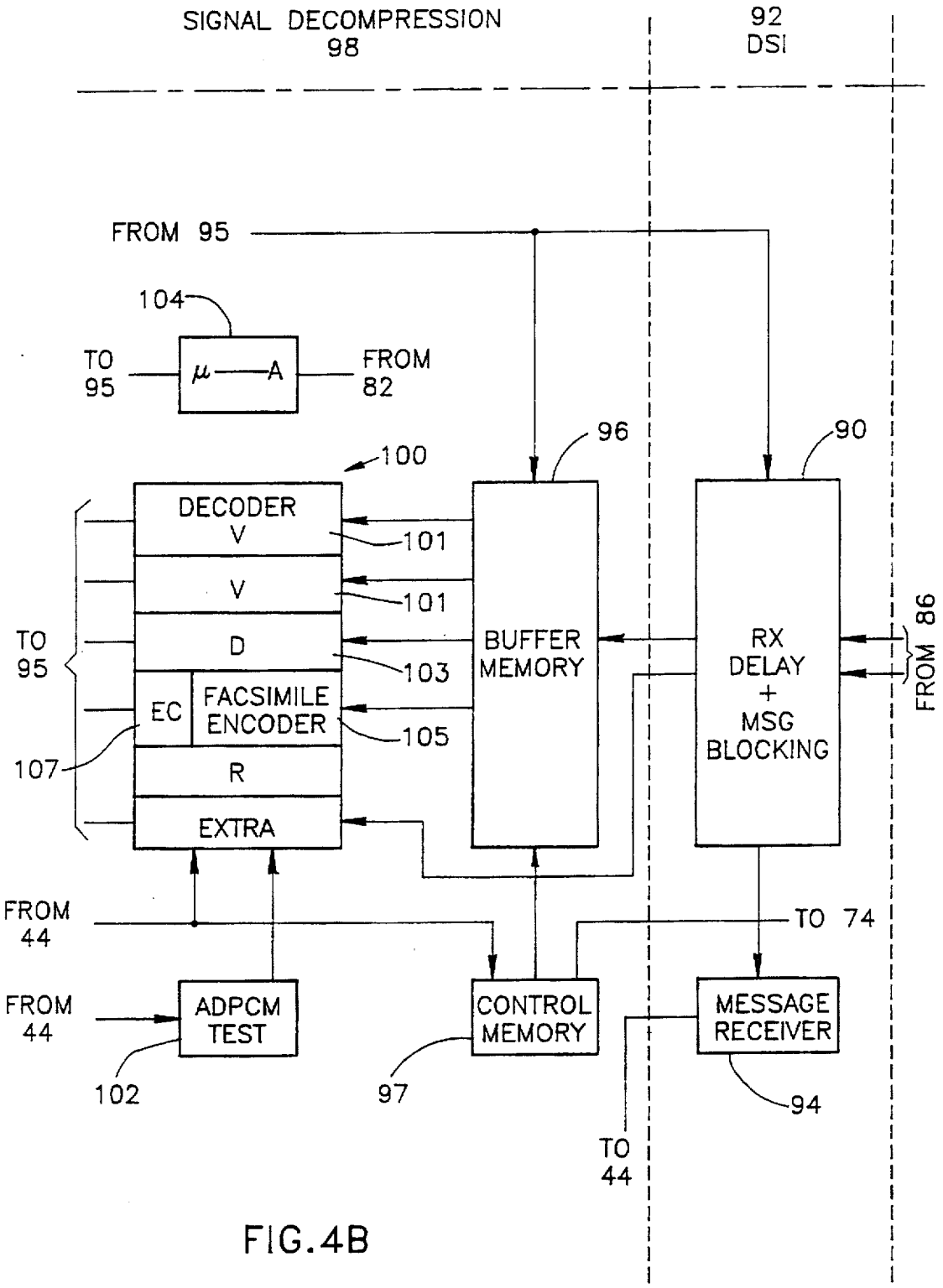

Reference is now made to FIG. 4, which illustrates in clock diagram form certain elements of the reception end of a telecommunication system pertaining to the present invention. The reception end corresponds to the mirror of the functional block diagram of FIG. 1 and the signal progresses from a BDLI, to a signal decompression unit, to DSI circuitry and finally, to a TDLI, as described in aforesaid U.S. Pat. No. 4,747,096.

The receive circuitry of FIG. 4 comprises a message receiver 94 (FIG. 3B) which looks for an exclusive message identification code and the message contents following it. Once detected, the message contents are transferred to the main CPU 44 which decodes it to discover the location, on the bearer bit stream, of the assigned bits for each compressed trunk channel and the type of traffic, speech, voiceband data or facsimile data, carried therein. As noted in U.S. Pat. No. 4,747,096, the main CPU 44 controls both the transmit and receive functions of the system and, in receive mode, controls DSI switch 95 in accordance with the assignment messages received.

The generally fully populated 2.048 Mbit/s delayed output of receive delay 90 is supplied to a buffer memory 96 which forms part of signal decoding circuitry 98. The buffer memory 96 outputs to a plurality of decoders 100, each comprising voice ADPCM decoders 101, data optimized ADPCM decoders 103, and facsimile encoders 105 with optional Error Correction (EC) 107, and is controlled by the main CPU 44 through control memory 97.

The received compressed signals are routed to the appropriate decoder type 101, 103 or 105, along 2.048 Mbit/s digital bit streams, in accordance with the messages received. Each set of voice ADPCM decoders 101 and each set of data optimized ADPCM decoders 103 can potentially produce two 2.048 Mbit/s digital bit streams of 8-bit PCM samples upon decoding one fully populated 2.048 Mbit/s digital bit stream of compressed signals. Each set of facsimile encoders 105 can potentially produce one 2.048 Mbit/s digital bit stream of 8-bit PCM per sample channels upon encoding one partly populated 2.048 Mbit/s digital bit stream of 9.6 Kbit s demodulated facsimile signals. 6:1 decompression is provided when Error Correction EC 107 is not implemented and 4:1 decompression is provided when EC 107 is employed.

According to an alternative embodiment of the invention, buffer memory 96 receives packets of samples of either compressed speech, non-facsimile data or facsimile data. Buffer memory 96 is operative to store the received packets and to individually release the samples to the appropriate one of the plurality of decoders 100.

The receive DSI 95 switch receives the 2.048 Mbit/s digital streams of 8-bit PCM samples from the signal decoders 100. They are switched to eight 2.048 Mbit/s bit streams under control of CPU 44, in accordance with the routing message received from the far end terminal.

Figure 5:
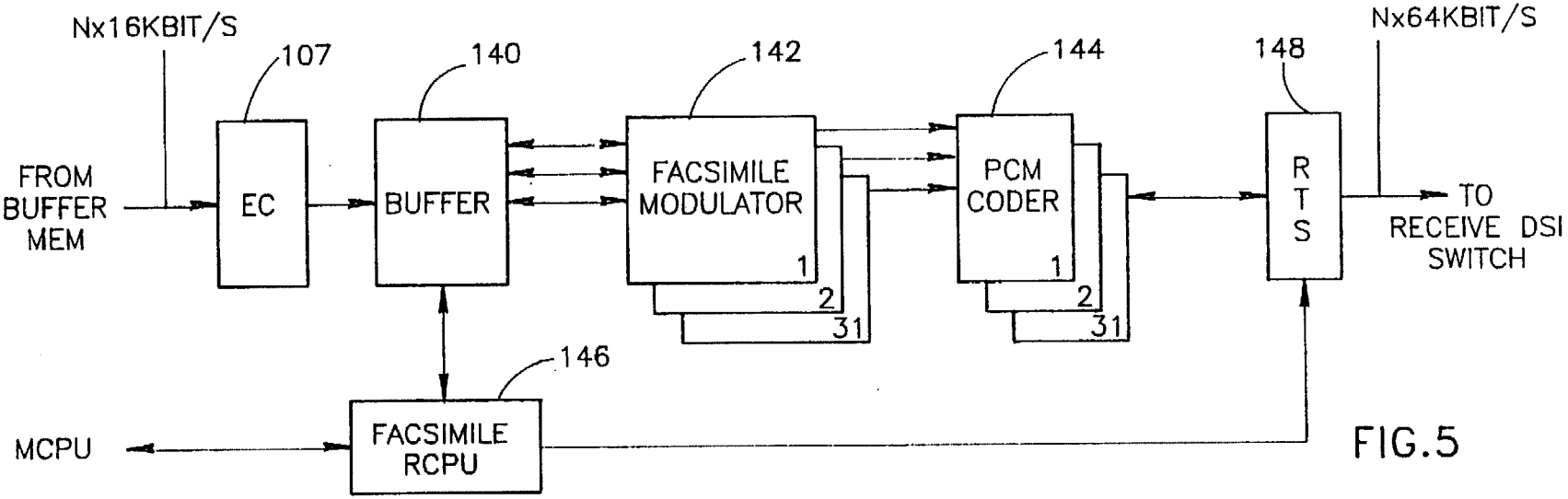
FIG. 5 is a block diagram illustration of the facsimile modulator useful in the apparatus of FIGS. 3A and 3B.

Reference is now made to FIG. 5 which illustrates the elements of the facsimile encoder 105 and of the optional EC 107. According to an alternate embodiment of the invention, the EC 107 performs error correction on the 16 kbit/s demodulated signal with error correction information received from buffer memory 96. The EC 107 first strips the signal of the dummy sixteenth bit. Using the Hamming (15,11) code, the EC 107 corrects any errors produced by the transmission and produces an 11 bit corrected signal. In order to produce the original 10 or 9 bit signal, one or two dummy bits, respectively, are subsequently stripped off, according to the status of the message dummy bit. The original 9 or 10 bit signal is sent to a buffer 140.

According to a preferred embodiment of the invention, facsimile decoder 105 comprises a plurality of facsimile modulators 142, such as the R96MFX Monofax from Rockwell International, and a plurality of PCM coders 144, where each PCM coder 144, is directly connected to a facsimile modulator 142. A typical facsimile decoder 105 comprises 31 facsimile modulators 142 and 31 PCM coders 144.

The facsimile decoder 105 operates as follows. The 9.6 kbit/s signal is received by butter 140 as sequences of 9 or 10 bits. Buffer 140 stores the bits as they arrive and rebuilds the signal as an 8 bit signal which it then sends to a facsimile modulator 142 which has been tuned, by a facsimile Receive CPU (RCPU) 146, to the mode of operation by which the signal was demodulated on the transmit side. If the received facsimile data was originally scanned and encoded at a rate lower than 9.6 kbit/s, then the additional dummy bits are stripped in the buffer 140 and the 8 bit signal is sent to a facsimile modulator at a respectively lower rate.

The analog telephone waveform resulting from the facsimile modulator 142 is then sent to the corresponding PCM coder 144 which encodes the analog signal as a PCM signal. The plurality of PCM signals produced by the PCM decoders 144 are routed to the appropriate time slot in the trunk bit stream by a facsimile Receive TSI (RTSI) 148, such as the PEB 2040 PCM Switch from Siemens.

According to a preferred embodiment of the invention, facsimile RCPU 146 is operative to indicate to the buffer 140 how to rebuild the 8 bit signal and to which facsimile modulator 142 to send the rebuilt signal. It also tunes the selected facsimile modulator 142 to the correct mode of operation according to directions received from the main CPU 44. Finally, it indicates to the facsimile RTSI 148 the time slots on the trunk bit stream corresponding to the outputs of the plurality of PCM coders 144.

It will be appreciated that a facsimile compression system such as described hereinabove can be constructed outside of an telecommunication system using elements functionally similar to those described hereinabove. However, incorporating such a system within an existing system, such as a digital circuit multiplication system or a speech packetization system, reduces the number of new elements which must be built since many of the necessary elements are already incorporated into the existing system.

We claim:

1. A telecommunication system for interconnecting a plurality of telephone communication trunks, carrying voice, facsimile and non-facsimile voiceband data signals, to a transmission network, said system comprising:

transmission means at at least a first end of said transmission network including;

means for detecting facsimile signals, as distinguished from other voiceband data signals, on said plurality of telephone communications trunks;

means for demodulating only said facsimile signals;

means for transmitting along said transmission network, in demodulated form, the facsimile signal output of the means for demodulating; and receiving means at at least a second end of the transmission network including:

means for modulating said facsimile signals received along said transmission network.

2. A telecommunication system according to claim 1 and wherein said transmission means also comprises:

means for detecting other signals;

means for compressing said other signals; and means for transmitting said other signals along said transmission network; and said receiving means also comprises:

means for receiving said other signals transmitted along the transmission network; and means for decompressing said other signals.

3. A telecommunication system according to claim 1 and wherein said transmission means also comprising means for determining the mode of operation of the detected facsimile signals.

4. A telecommunication system according to claim 2 and wherein said transmission means also comprising means for determining the mode of operation of the detected facsimile signals.

5. A telecommunication system according to claim 3 and wherein said transmission means also comprises means for transmitting to said receiving means over said transmission network an indication of the mode of operation of the detected facsimile signals.

6. A telecommunication system according to claim 4 and wherein said transmission means also comprises means for transmitting to said receiving means over said transmission network an indication of the mode of operation of the detected facsimile signals.

7. A telecommunication system according to claim 5 and wherein said receiving means comprises means responsive to a received indication of the mode of operation of the detected facsimile signals to cause said means for modulating to operate in a corresponding mode of operation.

8. A telecommunication system according to claim 6 and wherein said receiving means comprises means responsive to a received indication of the mode of operation of the detected facsimile signals to cause said means for modulating to operate in a corresponding mode of operation.

9. A telecommunication system according to claim 2 and wherein said transmission means also comprises means for transmitting to the receiving means an indication of the nature of the signals transmitted thereby as facsimile signals or other signals.

10. A telecommunication system according to claim 9 and and wherein said receiving means also comprises means for receiving said indication of the nature of the signals and for causing the operation of said means for modulating and said means for decompressing accordingly.

11. A system according to claim 2 and wherein said other signals comprise voice signals and voiceband data signals, said means for compressing comprise means for compressing said voice signals and means for compressing said voiceband data signals and said means for decompressing comprise means for decompressing said voice signals and means for decompressing said voiceband data signals.

12. A system according to claim 9 and wherein said other signals comprise voice signals and voiceband data signals, said means for compressing comprise means for compressing said voice signals and means for compressing said voiceband data signals and said means for decompressing comprise means for decompressing said voice signals and means for decompressing said voiceband data signals.

13. A system according to claim 10 and wherein said other signals comprise voice signals and voiceband data signals, said means for compressing comprise means for compressing said voice signals and means for compressing said voiceband data signals and said means for decompressing comprise means for decompressing said voice signals and means for decompressing said voiceband data signals.

14. A system according to claim 1 and wherein said facsimile signals are Group 3 facsimile signals.

15. A system according to claim 1 and wherein said means for detecting the presence of facsimile signals comprises means for detecting a sequence of flag characters in Group 3 facsimile binary coded signaling signals.

16. A system according to claim 3 and wherein said means for determining the mode of operation comprises:

a plurality of facsimile demodulators, each being programmed to demodulate at least one expected modem signal according to the Group 3 facsimile standard;

means for initially supplying meaning selected facsimile signals simultaneously to said plurality of facsimile demodulators; and means for determining which of said plurality of facsimile demodulators initially successfully demodulates an incoming selected facsimile signal.

17. A system according to claim 4 and wherein said means for determining the mode of operation comprises:

a plurality of facsimile demodulators, each being programmed to demodulate at least one expected modem signal according to the Group 3 facsimile standard;

means for initially supplying incoming selected facsimile signals simultaneously to said plurality of facsimile demodulators; and means for determining which of said plurality of facsimile demodulators initially successfully demodulates an incoming selected facsimile signal.

18. A system according to claim 16 and wherein said means for demodulating comprises:

means for utilizing the facsimile demodulator which initially successfully demodulates an incoming selected facsimile signal for continuing demodulation of said incoming selected facsimile signal.

19. A system according to claim 17 and wherein said means for demodulating comprises:

means for utilizing the facsimile demodulator which initially successfully demodulates an incoming selected facsimile signal for continuing demodulation of said incoming selected facsimile signal.

20. A system according to claim 16 and wherein said plurality of facsimile demodulators include V.29, V.21 and V.27 demodulators.

21. A system according to claim 17 and wherein said plurality of facsimile demodulators include V.29, V.21 and V.27 demodulators.

22. A system according to claim 20 and and also comprising a buffer providing a predetermined delay for receiving the outputs of said plurality of facsimile demodulators and wherein positive identification of the transmission rate of a V.27 modem signals by a V.27 demodulator takes place after said predetermined delay.

23. A system according to claim 21 and and also comprising a buffer providing a predetermined delay for receiving the outputs of said plurality of facsimile demodulators and wherein positive identification of the transmission rate of a V.27 modem signal by a V.27 demodulator takes place after said predetermined delay.

24. A system according to claim 22 and wherein upon detection of a V.27 modem carrier but before positive identification of its transmission rate, said buffer is operative to transmit at least part of said V.27 modem carrier.

25. A system according to claim 23 and wherein upon detection of a V.27 model carrier but before positive identification of its transmission rate, said buffer is operative to transmit at least part of said V.27 modem carrier.

26. A system according to claim 1 and wherein said demodulating means comprises facsimile signal demodulator and forward error correction means wherein said forward error correction means are operative to protect the output of said facsimile demodulator.

27. A telecommunication compressing system for interconnecting a first plurality of telephone communication channels, carrying voice, facsimile and non-facsimile voiceband data signals, to a transmission network comprising a second plurality of transmission channels, said system comprising:

transmission means at at least a first end of said transmission network including:

means for detecting signals on said first plurality of telephone communication channels and means for assigning each telephone communication channel to an available one of the second plurality of transmission channels;

means for classifying said signals on said first plurality of telephone communication channels at least as selected facsimile signals and other signals;

first means for demodulating only said selected facsimile signals, as distinguished from other voiceband data signals;

second means for compressing said other signals;

means for connecting said demodulated facsimile signals and said compressed other signals to the second plurality of transmission channels;

means for communicating the assignment and the classification of said signals on said second plurality of transmission channels along said transmission network;

receiving means at at least a second end of the transmission network including:

means for receiving communications from said means for communicating for determining the assignment and the classification of said second plurality of signals received along said transmission network;

third means for modulating said selected facsimile signals received along said transmission network;

fourth means for decompressing said other signals received along said transmission network; and means for connecting said signals on said second plurality or transmission channels to said third means for modulating and said fourth means for decompressing according to the classification thereof of said signals.

28. A system according to claim 1 and wherein said means for detecting facsimile signals is operative for detection of facsimile signals including signals which do not conform to CCITT recommendation T.30.

29. A system according to claim 2 and also comprising means responsive to said means for detecting facsimile signals and to said means for detecting other signals for switching signals received along the telephone communication trunks to either said means for demodulating facsimile signals or to said means for compressing other signals.

30. A system according to claim 29 and wherein said means for switching is operative during a silent period occurring during facsimile "handshake".

31. A system according to claim 29 and wherein said switching means is operative to switch signals received along the telephone communication trunks to said means for compressing other signals when said plurality of facsimile demodulators fail to make a positive identification of a facsimile signal over a predetermined interval.

*32. A telecommunication system for interconnecting a plurality of telephone communication trunks, carrying voice, facsimile and non-facsimile voiceband data signals to a transmission network, the system comprising:*

*a transmitter at at least a first end of the transmission network including:*

*at least one detector which receives signals from said plurality of communication trunks and which detects facsimile signals thereon, as distinguished from other voiceband data signals by detecting a signal unique to facsimile signals;*

*at least one demodulator which receives facsimile signals and demodulates at least some of the facsimile signals detected by the detector to produce demodulated facsimile signals; and*

*an interface which receives the demodulated facsimile signals and transfers them to the transmission network.*

*33. A system according to claim 32 and further comprising:*

*a receiver at at least a second end of the transmission network including:*

*a modulator which receives demodulated facsimile signals transmitted along the transmission network and modulates them to produce voiceband facsimile signals.*

*34. A system according to claim 32, wherein the demodulator is operative to demodulate only facsimile signals.*

*35. A system according to claim 32, wherein the detector detects a signal sequence characteristic of a plurality of facsimile modes of operation.*

*36. A system according to claim 32 wherein the demodulator comprises:*

*a plurality of facsimile demodulators which receive a detected facsimile signal, each facsimile demodulator being programed to demodulate said facsimile signal according to a predetermined facsimile mode;*

*a second detector which receives the outputs of said facsimile detectors and detects which of the plurality of facsimile demodulators successfully demodulates an incoming facsimile signal.*

*37. A system according to claim 36 wherein the plurality of facsimile demodulators includes V.29, V.21 and V.27 demodulators.*

*38. A system according to claim 37 and also comprising a buffer providing a predetermined delay for receiving the outputs of said plurality of facsimile demodulators and wherein positive identification of the transmission rate of a V.27 modem signal by a V.27 demodulator takes place after said predetermined delay.*

*39. A system according to claim 38, wherein upon detection of a V.27 modem carrier but before positive identification of its transmission rate, said buffer is operative to transmit at least part of the V.27 modem carrier.*

*40. A system according to claim 32 wherein the transmission system also includes: a signal compressor which compresses signals other than those detected by said detector, and wherein said interface transmits said other signals along said transmission network.*

*41. A system according to claim 40 and also comprising:*

*a switch, responsive to the detector, which switches signals received along the telephone communication trunks to either said demodulator or said compressor.*

*42. A system according to claim 36 and also comprising:*

*a switch, responsive to the detector, which switches signals received along the telephone communication trunks to either said demodulator or said compressor.*

*43. A system according to claim 42 wherein said switch is operative to switch said detected signals to said compressor when the second detector fails to make positive identification of the mode of a facsimile signal during a predetermined interval.*

*44. A system according to claim 43 wherein said switch is operative to switch signals to said means for demodulating only during a silent period occurring during facsimile handshake.*

*45. A system according to claim 40 wherein:*

*the compressor is operative to compresses said other signals in accordance with their classification; and*

*the transmitter is operative to transmit said classification of the signals on the transmission network.*

*46. A system according to claim 32, wherein the transmission network comprises a plurality of transmission channels, and further comprising:*

*a router which assigns at least one of the signals received by the transmission system from the plurality of communication trunks to one of the transmission channels, wherein the transmitter communicates the assignment and optionally other information regarding the signals along the transmission network.*

*47. A method for interconnecting a plurality of telephone communication trunks carrying voice, facsimile and non-facsimile voiceband data signals, to a transmission network, the method comprising:*

*detecting facsimile signals, as distinguished from other voiceband data signals received from the plurality of telephone communication trunks;*

*demodulating only detected facsimile signals to form demodulated facsimile signals; and*

*transmitting the demodulated facsimile signals along the transmission network.*

*48. A method according to claim 47 wherein the detection of the facsimile signals comprises detecting a signal sequence characteristic of a plurality of facsimile modes of operation.*

*49. A method according to claim 47 wherein modulating only detected facsimile signals comprises determining the mode of operation of the detected facsimile signals.*

*50. A method according to claim 49 wherein the determination of the mode of operation comprises:*

*supplying an incoming detected facsimile signal simultaneously to a plurality of facsimile demodulators, each being programed to demodulate at least one expected modem signal according to a facsimile mode; and*

*determining which of the plurality of facsimile demodulators successfully demodulates an incoming selected facsimile signal.*

*51. A method for interconnecting a plurality of telephone communication trunks carrying voice, facsimile and non-facsimile voiceband data signals, to a transmission network, the method comprising:*

*detecting facsimile signals, as distinguished from other voiceband data signals received from the plurality of telephone communication trunks by detecting a signal sequence characteristic only of facsimile signals;*

*demodulating at least some of said detected facsimile signals to form demodulated facsimile signals; and*

*transmitting the demodulated facsimile signals along a transmission network.*

*52. A method according to claim 51 wherein the detection of the facsimile signals comprises detecting a signal sequence characteristic of a plurality of facsimile modes of operation.*

*53. A method according to claim 51 wherein modulating only detected facsimile signals comprises determining the mode of operation of the detected facsimile signals.*

*54. A method according to claim 53 wherein the determination of the mode of operation comprises:*

*supplying an incoming detected facsimile signal simultaneously to a plurality of facsimile demodulators, each being programed to demodulate at least one expected modem signal according to a facsimile mode; and*

*determining which of the plurality of facsimile demodulators successfully demodulates an incoming selected facsimile signal.*

*55. A telecommunication system for interconnecting a plurality of telephone communication trunks, carrying voice, facsimile and non-facsimile voiceband data signals to a transmission network, the system comprising:*

*a transmitter at at least a first end of the transmission network including:*

*a demodulator which receives facsimile signals and demodulates at least some of the facsimile signals to produce demodulated facsimile signals, including:*

*a plurality of facsimile demodulators which receive a detected facsimile signal said plurality of facsimile demodulators being programed to demodulate said facsimile signal according to different predetermined facsimile modes; and*

*a detector which receives the outputs of said plurality of facsimile demodulators and detects which of the plurality of facsimile demodulators successfully demodulates an incoming facsimile signal; and*

*an interface which receives the demodulated facsimile signals and transfers them to the transmission network.*

*56. A system according to claim 55 wherein the plurality of facsimile demodulators includes V.29, V.21 and V.27 demodulators.*

*57. A system according to claim 55 and also comprising a buffer providing a predetermined delay for receiving the outputs of said plurality of facsimile demodulators and wherein positive identification of the transmission rate of a V.27 modem signal by a V.27 demodulator takes place after said predetermined delay.*

*58. A system according to claim 57, wherein upon detection of a V.27 modem carrier but before positive identification of its transmission rate, said buffer is operative to transmit at least part of the V.27 modem carrier.*

*59. A system according to claim 55 and also including a facsimile detector which receives signals from said plurality of communication trunks and which detects facsimile signals thereon, as distinguished from other voiceband data signals by detecting a signal unique to facsimile signals.*

*60. A system according to claim 59 wherein said facsimile detector is operative for detection of facsimile signals which do not conform to CCITT recommendation T.30.*

*61. A telecommunication system for interconnecting a plurality of telephone communication trunks, carrying voice, facsimile, and non-facsimile voiceband data signals to a transmission network, the system comprising:*

*a transmitter at at least a first end of the transmission network including:*

*at least one detector which receives signals from said plurality of communication trunks and which detects facsimile signals thereon, as distinguished from other voiceband data signals;*

*at least one demodulator which receives facsimile signals and demodulates only facsimile signals detected by the detector to produce demodulated facsimile signals; and*

*an interface which receives the demodulated facsimile signals and transfers them to the transmission network.*

* * * * *